United States Patent
Allain et al.

(10) Patent No.: US 9,427,939 B2
(45) Date of Patent: Aug. 30, 2016

(54) STEEL SHEET WITH HIGH MECHANICAL STRENGTH, DUCTILITY AND FORMABILITY PROPERTIES, PRODUCTION METHOD AND USE OF SUCH SHEETS

(75) Inventors: Sebastien Allain, Pont-a-Mousson (FR); Jan Mahieu, Dendermonde (BE); Mickael Denis Crouvizier, Mondelange (FR); Thierry Mastrorillo, Seremange-Erzange (FR); Arnaud Hennion, Dalhem (BE)

(73) Assignee: ARCELORMITTAL INVESTIGACIÓN Y DESARROLLO, S.L., Sestao Bizkala (ES)

( * ) Notice: Subject to any disclaimer, the term of this patent is extended or adjusted under 35 U.S.C. 154(b) by 470 days.

(21) Appl. No.: 14/116,734

(22) PCT Filed: May 3, 2012

(86) PCT No.: PCT/FR2012/000174
§ 371 (c)(1),
(2), (4) Date: Mar. 5, 2014

(87) PCT Pub. No.: WO2012/153016
PCT Pub. Date: Nov. 15, 2012

(65) Prior Publication Data
US 2014/0170439 A1   Jun. 19, 2014

(30) Foreign Application Priority Data
May 10, 2011  (FR) ..................................... 11 00286

(51) Int. Cl.
*C21D 1/20* (2006.01)
*C21D 8/02* (2006.01)
(Continued)

(52) U.S. Cl.
CPC ............... *B32B 15/013* (2013.01); *C21D 1/20* (2013.01); *C21D 8/0247* (2013.01);
(Continued)

(58) Field of Classification Search
CPC .... C21D 1/20; C21D 8/0247; C21D 8/0263; C21D 9/46; C21D 9/22; C21D 38/001; C21D 38/02; C21D 38/04; C21D 38/06; C21D 38/34; C21D 38/42; C21D 38/58
See application file for complete search history.

(56) References Cited

U.S. PATENT DOCUMENTS

| | | | |
|---|---|---|---|
| 5,328,528 A | * | 7/1994 | Chen ...................... C21D 1/185 148/320 |
| 2005/0161134 A1 | * | 7/2005 | Ikeda ................... C21D 8/0273 148/651 |

(Continued)

FOREIGN PATENT DOCUMENTS

EP   1559798   8/2005

OTHER PUBLICATIONS

Bouquerel J. et al., "Microstructure-based model for the static mechanical behaviour of multiphase steels", Acta Materialia, Apr. 1, 2006, pp. 1443-1456, vol. 54, No. 6, Elsevier, Oxford, Great Britain.

(Continued)

*Primary Examiner* — Colleen Dunn
(74) *Attorney, Agent, or Firm* — Davidson, Davidson & Kappel, LLC (57) ABSTRACT

The present invention provides a cold rolled steel sheet. The steel sheet has a strength greater than 1000 MPa, a uniform elongation greater than 12% and a V-bendability greater than 90°. The composition of the steel sheet includes, expressed in per cent by weight, 0.15%≤C≤0.25%, 1.8%≤Mn≤3.0%, 1.2%≤Si≤2%, 0%≤Al≤0.10%, 0%≤Cr≤0.50%, 0%≤Cu≤1%, 0%≤Ni≤1%, 0%≤S≤0.005%, 0%≤P≤0.020%, Nb≤0.015%, Ti≤0.020%, V≤0.015%, Co≤1%, N≤0.008%, B≤0.001% whereby Mn+Ni+Cu≤3%. The remainder of the composition consists of iron and inevitable impurities resulting from processing. The microstructure includes, in area percentage, 5 to 20% polygonal ferrite, 10 to 15% residual austenite, 5 to 15% martensite and a balance of bainite. The bainite is in the form of laths and includes carbides between the laths. A number N of inter-lath carbides larger than 0.1 micrometers per unit of surface area is less than or equal to $50000/\text{mm}^2$. A fabrication method and a motor vehicle are also provided.

17 Claims, 2 Drawing Sheets

(51) Int. Cl.
*B32B 15/01* (2006.01)
*C21D 9/46* (2006.01)
*C22C 38/02* (2006.01)
*C22C 38/04* (2006.01)
*C22C 38/00* (2006.01)
*C22C 38/06* (2006.01)
*C22C 38/34* (2006.01)
*C22C 38/42* (2006.01)
*C22C 38/58* (2006.01)

(52) U.S. Cl.
CPC ............ *C21D 8/0263* (2013.01); *C21D 9/46* (2013.01); *C22C 38/001* (2013.01); *C22C 38/02* (2013.01); *C22C 38/04* (2013.01); *C22C 38/06* (2013.01); *C22C 38/34* (2013.01); *C22C 38/42* (2013.01); *C22C 38/58* (2013.01); *C21D 2211/002* (2013.01); *C21D 2211/004* (2013.01); *Y10T 428/12799* (2015.01)

(56) References Cited

U.S. PATENT DOCUMENTS

2009/0238713 A1* 9/2009 Kinugasa ............... C21D 1/20
420/83
2010/0307644 A1* 12/2010 Gil Otin ................ C21D 8/02
148/546

OTHER PUBLICATIONS

Koh-Ichi Sugimoto et al., "Effects of Second Phase Morphology on Retained Austenite Morphology and Tensile Properties in a TRIP-aided Dual-phase Steel Sheet", ISIJ International, Jan. 1, 1993, pp. 775-782, vol. 33, No. 7, Japan.

* cited by examiner

STEEL SHEET WITH HIGH MECHANICAL STRENGTH, DUCTILITY AND FORMABILITY PROPERTIES, PRODUCTION METHOD AND USE OF SUCH SHEETS

This invention relates to the fabrication of "multiphase" steel sheet which simultaneously exhibits mechanical strength and a forming capability that makes it possible to perform cold forming operations. The invention relates more specifically to steels that have a mechanical strength greater than 1000 MPa and a uniform elongation greater than 12%. Motor vehicles (automobiles, combine harvesters, trailers, semi-trailers, etc.) in particular constitute a field for the application of this type of steel sheet, with potential applications in structural parts, reinforcement components and even in the fabrication of abrasion-resistant parts.

BACKGROUND

The strong demand for a reduction in emissions of greenhouse gases, combined with increasingly stringent automobile safety requirements and fuel prices, has forced the builders of motor vehicles to make increasing use of steels that have improved mechanical strength in the bodies of their vehicles to reduce the thickness of the parts and therefore the weight of the vehicles, while maintaining the mechanical strength of the structures. In this regard, steels that combine high strength with sufficient formability without the appearance of cracks are acquiring increasing importance. Several families of steels that offer different levels of mechanical strength have been proposed in the past, one after another.

Steels have been proposed that contain micro-alloy elements, the hardening of which is obtained simultaneously by reducing the grain size and by fine precipitates. The development of increasingly hard steels led to the increased use of "dual phase" steels, where the presence of martensite in a ductile ferrite matrix makes it possible to achieve mechanical strength greater than 400 MPa associated with good suitability for cold forming.

To achieve characteristics of mechanical strength, ductility and formability which are even more advantageous for the automobile industry, for example, "TRIP" steels, for "Transformation Induced Plasticity" have been developed. These steels have a complex structure that includes a ductile structure, ferrite as well as martensite, which is a hard structure that contributes the high mechanical characteristics, and residual austenite, which contributes both strength and ductility thanks to the TRIP effect.

This TRIP effect designates a mechanism according to which, under additional deformation, such as during uniaxial stress, for example, the residual austenite of a sheet or blank made of TRIP steel is progressively transformed into martensite, which translates into a significant consolidation which retards the appearance of cracks. Nevertheless, TRIP steels exhibit mechanical strengths of less than 1000 MPa because their content of polygonal ferrite, which is a relatively weak and highly ductile structure, is greater than one-quarter of the total area percentage.

To meet this demand for steels with a mechanical strength greater than 1000 MPa, it is therefore necessary to reduce the structural fraction with low mechanical strength and to replace it with a phase that contributes greater hardening. However, it is known that in the field of carbon steels, an increase in mechanical strength is generally accompanied by a loss of ductility. In addition, the builders of motor vehicles are specifying increasingly complex parts that require steels that make it possible to achieve a bendability greater than or equal to 90° without the occurrence of cracking The contents of the chemical elements listed below are indicated in per cent by weight.

The relevant prior art also includes WO2007077933, which describes a microstructure composed of bainite, martensite and residual austenite. The chemical composition of the sheet disclosed in '933 includes 0.10-0.60% C, 1.0-3.0% Si, 1-3.5% Mn, up to 0.15% P, up to 0.02% S, up to 1.5% Al and 0.003 to 2% Cr, with the remainder consisting of iron and impurities. The microstructure in the framework of this patent is obtained during the annealing by a hold after the primary cooling at a temperature below the starting point of the martensite transformation Ms. The result is a microstructure which includes a mixture of tempered and/or partitioned martensite. The principal advantage claimed is an improvement in the resistance to hydrogen embrittlement. The presence of martensite, which is a hardening component in a softer bainitic matrix, makes it impossible to achieve the ductility and bendability expected in the framework of the invention.

The relevant prior art also includes GB 2,452,231, which describes the fabrication of steel sheet with a strength greater than 980 MPa with a satisfactory ultimate strength and properties that are satisfactory in terms of hole expansion and spot welding. The chemical composition of the sheet disclosed in '231 includes 0.12-0.25% C, 1.0-3.0% Si, 1.5-3% Mn, up to 0.15% P, up to 0.02% S and up to 0.4% Al, with the remainder consisting of iron and impurities. In addition, the ratio of the content of Si by weight to the content of C by weight, Si/C, is in the range of 7-14. The microstructure of the sheet contains at least 50% bainitic ferrite, at least 3% residual austenite in the form of laths, austenite in solid form, the average grain size of which is less than or equal to 10 micrometers, whereby this solid austenite is present in the amount of 1% up to one-half of the content in terms of austenite in laths. This prior art patent provides no information on the bendability of the sheet produced and mentions the absence of carbides in the bainite.

SUMMARY OF THE INVENTION

An object of the present invention is to provide a cold-rolled steel which has a mechanical strength greater than 1000 MPa, together with a uniform elongation greater than 12%. An additional object of the present invention is to provide a steel that is suitable for shaping so that an angle of 90° is achieved in a V-bend without cracking The present invention advantageously provides a steel, the composition of which does not include expensive micro-alloy elements such as titanium, niobium or vanadium. In this manner, the fabrication cost is reduced and the thermomechanical fabrication processes can be simplified.

To this end, the present invention provides a cold-rolled and annealed steel sheet with a mechanical strength greater than or equal to 1000 MPa, a uniform elongation equal to or greater than 12%, and the composition of which includes, whereby the contents are expressed in per cent by weight, $0.15\% \leq C \leq 0.25\%$ $1.8\% \leq Mn \leq 3.0\%$ $1.2\% \leq Si \leq 2\%$ $Al \leq 0.10\%$ $0\% \leq Cr \leq 0.50\%$ $0\% \leq Cu \leq 1\%$ $0\% \leq Ni \leq 1\%$ $S \leq 0.005\%$ $P \leq 0.020\%$ $Nb \leq 0.015\%$ $Ti \leq 0.020\%$ $V \leq 0.015\%$ $Co \leq 1\%$ $N \leq 0.008\%$ $B \leq 0.001\%$ whereby $Mn+Ni+Cu \leq 3\%$ with the remainder of the composition consisting of iron and the inevitable impurities resulting from processing, whereby the microstructure is constituted, in area proportions, of 5 to 20% polygonal ferrite, 10 to 15% residual austenite, 5 to 15% martensite, with the balance consisting of bainite in the form of laths and containing, between these laths, carbides such that the number N of the inter-lath carbides larger than 0.1 micrometer per unit of surface area is less than or equal to $50000/mm^2$.

The present invention may also include the following characteristics, considered individually or in combination:

the composition includes, whereby the content is expressed in per cent by weight:

$0.18\% \leq C \leq 0.22\%$ the composition includes, whereby the content is expressed in per cent by weight:

$2\% \leq Mn \leq 2.6\%$ the composition includes, whereby the content is expressed in per cent by weight:

$1.4\% \leq Si \leq 1.8\%$ the composition includes, whereby the content is expressed in per cent by weight:

$0\% \leq Cr \leq 0.35\%$ the V-bending angle at which cracking occurs is greater than or equal to 90°:

the steel sheet also has a coating of zinc or zinc alloy.

The present invention also provides a method for the fabrication of cold rolled and annealed steel sheet with strength greater than or equal to 1000 MPa and elongation greater than or equal to 12%, comprising the following steps, in which:

a steel having the composition claimed by the invention is obtained, then this steel is cast in the form of a semi-finished product, then this semi-finished product is brought to a temperature $T_{rech}$ which is greater than 1150° C. to obtain a reheated semi-finished product, then this reheated semi-finished product is hot rolled, whereby the temperature at the end of the hot rolling $T_{fl}$ is greater than or equal to 850° C., to obtain a hot-rolled sheet, then this hot-rolled sheet is coiled at a temperature $T_{coil}$ which is in the range between 540 and 590° C. to obtain a coiled, hot-rolled sheet, then this coiled, hot-rolled sheet is cooled to the ambient temperature, then, a batch annealing of this coiled, hot-rolled sheet is performed so that the mechanical resistance is less than or equal to 1000 MPa at all points of the coiled, hot-rolled sheet, then the annealed, coiled, hot-rolled sheet is uncoiled and pickled to obtain a hot-rolled sheet suitable for cold rolling, then the hot-rolled sheet suitable for cold rolling is cold rolled at a rate of reduction in the range between 30 and 80%, to obtain a cold-rolled sheet, then, this cold-rolled sheet is annealed by reheating it at a rate Vc which is between 2 and 6° C. per second to a temperature $T_1$ which is between Ac3-15° C. and Ac3-45° C. for a period of time $t_1$ which is greater than or equal to 50 seconds, then this cold-rolled sheet is cooled by subjecting it to a first cooling step at a rate of cooling between 50 and 1500° C./s, then to a second cooling step such that the temperature at the end of the second cooling step $T_{fr}$ is between a temperature $T_{fr1}$ equal to Ms-20° C. and a temperature $T_{fr2}$ equal to MS+40° C., then the cold-rolled sheet is held in the temperature range between $T_{fr1}$ and $T_{fr2}$ for a length of time $t_2$ between 100 and 1000 seconds, then the cold-rolled sheet is cooled at a rate $V_{R2}$ between 3 and 25° C. per second to the ambient temperature to obtain a cold-rolled and annealed sheet.

The present invention may also include the characteristics listed below, considered individually or in combination:

the temperature Tf1 is greater than or equal to 900° C., the batch annealing includes a hold time at the temperature Tm and for the length of time tm such that:

$$2.29 \times Tm(°\ C.) + 18.6 \times tm(h) \geq 1238,$$

whereby the hold temperature Tm is also higher than 410° C.

the temperature $T_1$ is in the range between 790° C. and 820° C., a cold-rolled, annealed sheet claimed by the invention is obtained, and coated with zinc or a zinc alloy, a cold-rolled, annealed sheet claimed by the invention is obtained and annealed at a hold temperature $T_{base}$ in the range between 150° C. and 200° C. for a hold time $t_{base}$ between 10 h and 48 h.

The present invention further provides fabricating parts for motor vehicles that include the cold-rolled and annealed sheet or the coated sheet according to the present invention.

BRIEF DESCRIPTION OF THE DRAWINGS

Additional characteristics and advantages of the invention will be made clear in the following description, which is provided by way of example, and refers to the accompanying figures, in which.

DETAILED DESCRIPTION

Figure 1:
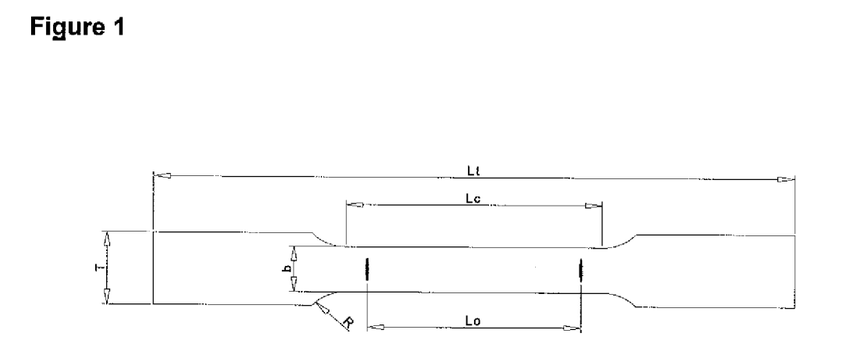
FIG. 1 shows the dimensions of the tensile test piece used to determine the mechanical properties.
Figure 2:
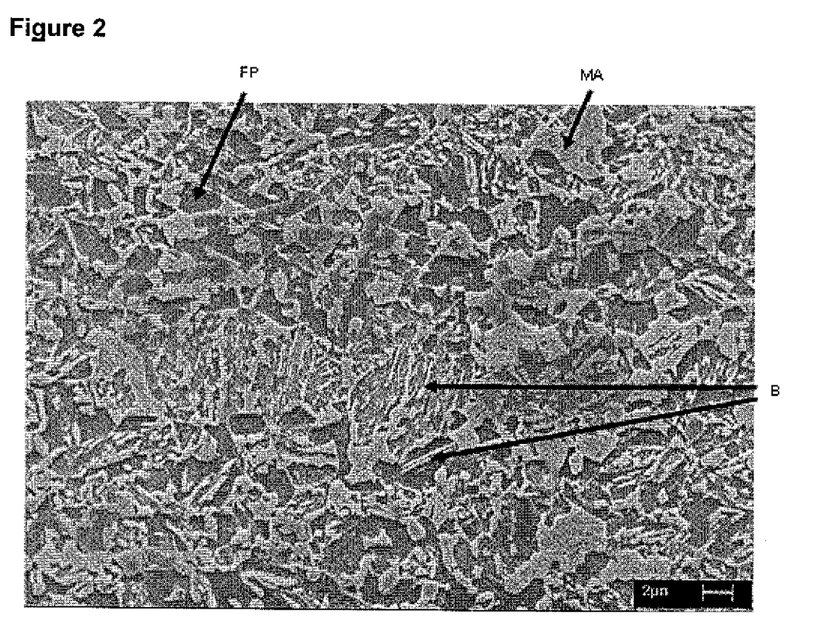
FIG. 2 shows an example of a microstructure of a steel sheet according to a preferred embodiment of the present invention.
Figure 3:
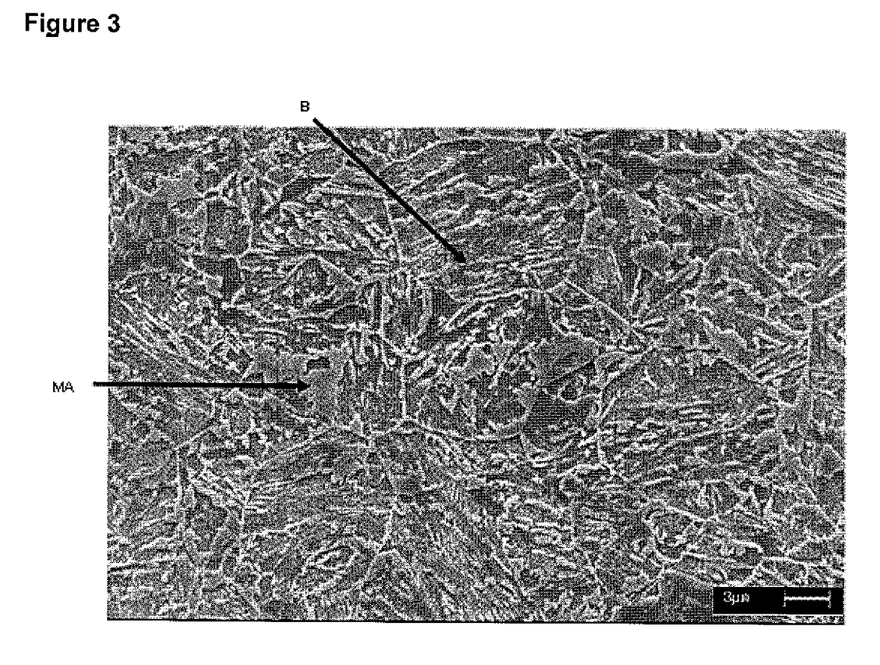
FIG. 3 shows an example of the microstructure of a steel sheet which is not covered by the invention.

In the above mentioned figures, FP refers to polygonal ferrite, B refers to bainite, MA indicates the islands of martensite and austenite.

Research conducted in the framework of this invention has demonstrated the benefits of the presence of the polygonal ferrite, which is characterized by a density of dislocations less than that of bainitic ferrite. Polygonal ferrite is formed during an inter-critical annealing and makes possible a V-bendability greater than 90° as well as a uniform elongation greater than 12%.

The influence of the presence of polygonal ferrite that is formed below the point Ac3 in the inter-critical range (ferrite+austenite) during the hold for annealing has been studied. The presence of this ferrite in a bainitic matrix that includes residual austenite, and inevitably also martensite, provides reason to expect that the formability will be reduced on account of the difference in hardness between these different components. Surprisingly, the presence of polygonal ferrite between 5 and 20% turns out to be a factor that improves the bendability of the sheet according to a preferred embodiment of the present invention, which makes it possible to exceed a V-bending angle of 90° without the occurrence of cracking It has also been demonstrated that the absence of this polygonal ferrite also has an adverse effect on the ductility measured by the criterion of uniform elongation.

With regard to the chemical composition of the steel, carbon plays an important role in the formation of the microstructure and in the mechanical properties in terms of ductility and strength via the TRIP effect, which is produced by the residual austenite. Starting with the majority austenitic structure formed at high temperature during the hold at the temperature $T_1$, a cooling is performed, followed by a hold during which a bainitic transformation occurs. During this transformation, the bainite is initially formed within a matrix which also has a majority austenitic structure. Because carbon is significantly less soluble in ferrite than in austenite, the carbon is rejected in this austenite and precipitates partly in the form of very fine carbides. The fineness of the carbides can be such that the number N of these inter-lath carbides larger than 0.1 micrometers per unit of surface area is less than or equal to $50000/mm^2$.

Thanks to certain alloy elements that are present in the compositions claimed by the invention, in particular silicon, the precipitation of carbides, in particular cementite, occurs only to a limited extent. The austenite which has not yet been transformed is progressively enriched with carbon, with practically no precipitation of non-fine carbides at the austenite-bainite interface. This enrichment is such that the austenite is stabilized, i.e. the martensitic transformation of this austenite is limited to the specified proportions of 5 to 15% during the cooling to ambient temperature. Thus a limited quantity of martensite appears which contributes in a controlled manner to the increase in mechanical strength.

According to the invention, the carbon content, by weight, is in the range between 0.15 and 0.25%. If the carbon content of the invention is below 0.15% by weight, the mechanical strength becomes insufficient and the stability of the residual austenite is insufficient. Above 0.25%, weldability is increasingly reduced because low-strength microstructures are formed in the Heat Affected Zone (HAF) or in the molten zone in the case of autogenous welding, although the TRIP effect is improved above 0.25% carbon.

In one preferred embodiment, the carbon content is in the range between 0.18 and 0.22%. Within this range, the weldability is satisfactory, the stabilization of the austenite is optimized and the proportion of martensite is within the range specified by the invention.

Manganese is an element that hardens by solid solution substitution; it stabilizes the austenite and lowers the transformation temperature Ac3. Manganese therefore contributes to an increase in mechanical strength. The present invention teaches that a minimum content of 1.8% by weight is necessary to achieve the desired mechanical properties. However, above 3.0% its gamma-forming character leads to the formation of a structure with excessively prominent bands which can adversely affect the working properties of the automobile structural part. Its coatability is also reduced. Preferably, an interval of manganese content between 2% and 2.6% achieves satisfactory mechanical strength without increasing the risk of banded structures which have an adverse effect on the forming and without increasing the hardenability in the welded alloys, which would adversely affect the weldability of the sheet in accordance with a preferred embodiment of the present invention.

The stabilization of the residual austenite is made possible by the addition of silicon, which significantly slows the precipitation of carbides during the annealing cycle and more particularly during the bainitic transformation. That results from the fact that the solubility of silicon in cementite is very low and that this element increases the activity of carbon in austenite. Any formation of cementite will therefore be preceded by a step where Si is expelled at the interface. The enrichment of the austenite with carbon therefore leads to its stabilization at room temperature on the annealed steel sheet. The subsequent application of an outside stress, during forming, for example, will lead to the transformation of this austenite into martensite. One of the results of this transformation is an improvement in the mechanical strength. With regard to the properties specified by the invention, an addition of silicon in a quantity greater than 2% will significantly promote the ferrite and the specified mechanical strength would not be achieved. Moreover, strongly adhering oxides would be formed which could lead to surface defects. The minimum content should therefore be set at 1.2% by weight to obtain the stabilizing effect on the austenite. Preferably, the silicon content will be in the range between 1.4 and 1.8% to optimize the above mentioned effects.

The chromium content must be limited to 0.5%. This element makes it possible to control the formation of proeutectoid ferrite during cooling as part of the annealing starting from this temperature $T_1$. This ferrite, when present in high quantities, reduces the mechanical strength necessary for certain parts covered by a preferred embodiment of the present invention. This element hardens and refines the bainitic microstructure. The chromium content will preferably be less than 0.35% for reasons of cost and to prevent excessive hardening.

Nickel and copper have effects which are essentially similar to those of manganese for the present invention, although they have different weights with regard to their ability to stabilize the austenite. That is why the combination of these three elements in the chemical composition of the present invention must satisfy the following expression: Mn+Ni+Cu≤3%.

In a quantity greater than 1%, nickel, which is a powerful stabilizer of austenite, will promote an excessive stabilization of the austenite, the transformation under mechanical stress will be more difficult to achieve and the effect on the ductility will be less. Above 1%, the cost of adding this alloy element is also excessive.

In a quantity greater than 1%, copper, which is also a powerful stabilizer of austenite, will promote an excessive stabilization of the austenite, the transformation under mechanical stress will be more difficult to achieve and the effect on the ductility will be less. Above 1%, the cost adding this alloy element is also excessive and can cause hot forging defects.

The aluminum content is limited to 0.10% by weight; this element is a powerful alpha-former which promotes the formation of ferrite. A high content of aluminum would increase the Ac3 point and would therefore make the industrial process expensive in terms of the amount of electric power required for annealing.

It should also be recalled that high levels of aluminum increase the erosion of refractories and the risk of clogging of the nozzles during the casting of the steel upstream of the rolling mill. Aluminum also segregates negatively and can result in macro-segregations. In excessive quantities, aluminum reduces hot ductility and increases the risk of the appearance of defects in continuous casting. Without strict control of the casting conditions, micro- and macro-segregation defects ultimately result in a central segregation in the annealed steel sheet. This central band will be harder than its surrounding matrix and will adversely affect the workability of the material.

Above a sulfur content of 0.005%, ductility is reduced on account of the excessive presence of sulfides such as MnS (manganese sulfides), which reduces the formability of the material.

Phosphorus is an element that hardens in solid solution but significantly reduces suitability for spot welding and hot ductility, in particular on account of its tendency toward grain boundary segregation or its tendency to co-segregate with manganese. For these reasons, the phosphorus content must be limited to 0.020% to obtain good suitability for spot welding.

Molybdenum is limited to the level of an impurity, although it can play an effective role in hardening and retards the appearance of bainite. Nevertheless, the addition of molybdenum excessively increases the cost of the alloy elements, and its use is therefore limited for economic reasons.

Boron has a strong effect on the hardenability of the steel. Boron limits the activity of carbon and limits the transformations of diffusive phases (ferritic or bainite transformation during cooling), thereby promoting the formation of hardening phases such as martensite. This effect is not desirable in a preferred embodiment of the present invention, because an objective is to promote the bainitic transformation to stabilize the austenite and prevent the formation of an excessive area percentage of martensite. The boron content is therefore limited to 0.001%.

Micro-alloy elements such as niobium, titanium and vanadium are respectively limited to the maximum levels of 0.015%, 0.020% and 0.015%, because these elements have the particular feature of forming hardening precipitates with carbon and/or nitrogen, which also tend to reduce the ductility of the product. They also retard the recrystallization during annealing and therefore make the microstructure finer, which also hardens the material and reduces its ductility.

The steel can also contain cobalt in amounts less than or equal to 1%, because this hardening element makes it possible to increase the carbon content in the residual austenite. However, its use may be limited in the present invention for reasons of cost.

The remainder of the composition including iron and the inevitable impurities resulting from processing.

According to a preferred embodiment of the present invention, the microstructure includes, in area percentage, of 5 to 20% polygonal ferrite, 10 to 15% residual austenite, 5 to 15% martensite, the balance consisting of bainite in the form of laths and including, between these laths, carbides such that the number N of inter-lath carbides larger than 0.1 micrometers per unit of surface area is less than or equal to $50000/mm^2$. This majority bainitic structure confers good resistance to damage. The residual austenite confers strength and ductility, whereby the polygonal ferrite also increases ductility and martensite increases the mechanical strength of the sheet. Polygonal ferrite is distinguished from bainitic ferrite in that it includes a significantly lower density of dislocations as well as a level of carbon in solid solution which is also less than that of the bainitic ferrite.

A quantity of residual austenite of less than 10% makes it difficult to significantly increase the uniform elongation. Therefore the steel may not achieve the specified uniform elongation of 12%. Beyond 15%, a high carbon content would be required to sufficiently stabilize it, and that would adversely affect the weldability of the steel. The carbon content of the residual austenite is preferably greater than 0.8% to obtain a residual austenite which is sufficiently stable at ambient temperature.

The presence of martensite between 5% and 15% makes it possible to achieve the mechanical strength specified in the framework of the invention, although above 15%, the martensitic fraction as an area percentage would adversely affect the sheet in terms of its ductility in the sense of uniform elongation and bendability. Below 5%, the specified mechanical strength is not achieved. Preferably, the martensite content will be greater than 10% to have a certain safety margin in terms of the mechanical strength.

The polygonal ferrite makes it possible to improve the ductility in the form of both the uniform elongation and the V-bendability to achieve the specified 90° inside angle. The ferrite content is between 5 and 20%. Ideally, the ferrite content should be between 12 and 20% to ensure improved ductility and a safety margin with respect to the uniform elongation.

Finally the bainite, by expelling the carbon toward the residual bainite during its formation, enriches the latter and therefore, all other things being equal, makes it possible to stabilize the matrix in the sheet claimed by the invention.

FIG. 2 shows one example of the microstructure of a steel sheet claimed by the invention viewed under a scanning electron microscope. Here, the residual austenite occupies an area percentage of 15%, and appears white, in the form of islands or films. Martensite is present in the form of islands in association with the residual austenite. The combination, which is commonly called MA islands, has a granular appearance due to the pitting caused by the chemical corrosion caused by the reagent (Nital). Here, martensite is present in an area percentage of 11%. Polygonal ferrite has a dished appearance. Bainite appears here in the form of the lamellar constituent indicated by the black arrows in FIG. 2.

Within certain islands, the local carbon content and thus the local hardenability can vary. In that case, the residual austenite is locally associated with martensite within this same island, which is called an "M-A" island, i.e. one that contains both martensite and residual austenite.

The number of carbides larger than 0.1 micrometers in the microstructure is limited. It has been shown that N, the number of inter-lath carbides larger than 0.1 micrometers per unit of surface area, should preferably be less than 50000/mm² to limit damage in the case of additional stress, for example during the hole expansion or V-bending tests. The excessive presence of coarse carbides may also be the cause of premature failure during subsequent forming.

The sheet in accordance with the present invention can be fabricated by any appropriate method. For example, a method of the present invention can be used, and may include the steps described below.

First, a steel in accordance with a preferred embodiment of the present invention is obtained. This steel is then used to cast a semi-finished product. This casting can produce ingots, or the steel can be continuously cast in the form of slabs.

The cast semi-finished products can then be brought to a temperature $T_{rech}$ which is greater than 1150° C. to obtain a heated semi-finished product such that the temperature is favorable in all points for the high degree of deformation to which the steel will be subjected during rolling. This temperature range makes it possible to be in the austenitic range. However, if the temperature $T_{rech}$ is greater than 1275° C., the austenite grains grow undesirably large and lead to a coarser final structure.

Of course, it is also possible to perform the hot rolling immediately after casting without reheating the slab.

The semi-finished product is therefore hot rolled in a temperature range where the structure of the steel is totally austenitic. If the temperature at the end of rolling $T_{fl}$ is less than the starting temperature of the transformation of the austenite into ferrite during cooling Ar3, the ferrite grains are work hardened by the rolling and the ductility is significantly reduced.

The hot-rolled product is then coiled at a temperature $T_{coil}$ between 540 and 590° C. This temperature range makes it possible to obtain a complete bainitic transformation during the quasi-isothermal hold associated with the coiling, followed by a slow cooling. A coiling temperature greater than 590° C. leads to the formation of undesirable oxides. When the coiling temperature is too low, the hardness of the product is increased, which increases the forces required during the later cold rolling.

The hot-rolled product is then pickled using a method which is in itself known.

A batch annealing of the coiled sheet can then be performed so that the hold temperature Tm is greater than 410° C., and Tm and the hold time tm are such that:

$$2.29 \times Tm(°\ C.) + 18.6 \times tm\ (h) \geq 1238.$$

This heat treatment makes it possible to have a mechanical strength less than 1000 MPa at every point of the hot-rolled sheet, thereby minimizing the variation in hardness between the center of the sheet and the edges. That significantly facilitates the following cold rolling step by softening the structure formed.

The cold rolling is then performed with a rate of reduction which is advantageously in the range between 30 and 80%.

The cold-rolled product is then heated, preferably in a continuous annealing facility, at an average heating rate $V_c$ between 2 and 6° C. per second. In combination with the annealing temperature $T_1$ below, this range of heating rates makes it possible to obtain a fraction of non-recrystallized ferrite which is strictly less than 5%.

The heating is continued to an annealing temperature $T_1$ which is between the temperature $Ac_3$-15° C. and $Ac_3$-45° C., i.e., in a particular temperature range of the inter-critical range such that a structure is obtained which is not free of polygonal ferrite formed in the inter-critical range. A dilatometric method which is in itself known can be used to determine the value of Ac3.

When $T_1$ is less than (Ac3-45° C.), the structure can contain a significant fraction of ferrite, and the mechanical characteristics specified by the present invention are not achieved. Conversely, if $T_1$ is above Ac3-15° C. and no ferrite is formed during the cooling following the hold at $T_1$, the uniform elongation and bendability (V-bend test) are then not within the target of the present invention, i.e., 12% uniform elongation and 90° in V-bending without the appearance of cracking Moreover, when the temperature $T_1$ approaches the critical point Ac3, that presents a risk, because industrial conditions can fluctuate slightly during production. Therefore, at the end of the hold at $T_1$, the microstructure can be either entirely austenitic or partly ferritic, with a very low portion of ferrite, which should be less than 5%. That results in unstable mechanical properties for the sheet produced at the conclusion of the process, which would have an undesirable effect on the final forming of the structural parts for motor vehicles.

An annealing temperature $T_1$ in accordance with a preferred embodiment of the present invention makes it possible to obtain a sufficient quantity of inter-critical austenite to subsequently form, during cooling, bainite in a quantity such that the residual austenite will be sufficiently stabilized and the desired mechanical characteristics will be achieved.

A minimum hold time $t_1$ which is greater than or equal to 50 s at the temperature $T_1$ allows the dissolution of the previously formed carbides, and in particular a sufficient transformation to austenite. A hold time greater than 500 s is difficult to reconcile with the productivity requirements of continuous annealing installations, in particular the unwinding speed of the coil. The hold time $t_1$ is therefore between 50 and 500 s.

At the end of the annealing hold, the sheet is cooled until it reaches a temperature which is preferably in the range between 370 and 430° C., the ideal being a temperature in the range between Ms-20° C. and Ms+40° C., whereby the cooling rate $V_{ref}$ must be rapid enough to prevent the formation of pearlite. To this end, the first cooling step is such that the cooling rate $V_{R1}$ is in the range between 50 and 1500° C. per second.

A partial transformation of the austenite into ferrite can occur at this stage in the first cooling step. This makes it possible, when the carbon is expelled toward the austenite, to stabilize the austenite to promote the TRIP effect because the carbon is not much soluble in ferrite. The carbon content in the residual ferrite will advantageously exceed 0.8% to stabilize it under ambient conditions. The purpose of the second stage of the cooling is to prevent the formation of pearlite before the hold in the range between 370 and 430° C.

The hold time in the temperature range from 370° C. to 430° C. must be longer than 100 seconds to allow the bainitic transformation and thus the stabilization of the austenite by the enrichment of this austenite with carbon. The hold time must also be less than 1000 s to limit the area percentage of bainitic ferrite. This latter restriction also makes it possible to prevent the formation of coarse carbides larger than 0.1 micrometers with a density greater than 50000/mm².

The sheet is then cooled at a rate $V_{R2}$ which is in the range between 3 and 25° C./s to ambient temperature. The result is a cold-rolled and annealed steel sheet which has, in area percentage, 5 to 20% polygonal ferrite, 10 to 15% residual austenite and 5 to 15% martensite, the remainder consisting of bainite.

A post batch annealing heat treatment is then advantageously performed, such that the cold-rolled and annealed sheet is held at a hold temperature $T_{base}$ in the range between 150° C. and 200° C. for a hold time $t_{base}$ in the range between 10 h and 48 h to improve the elastic limit and bendability.

The inventors have also found that minor variations in the fabrication parameters within the conditions defined in the method claimed by the invention do not result in major modifications of the microstructure or of the mechanical properties, which is an advantage in terms of the stability of the characteristics of the products fabricated.

This invention is illustrated below on the basis of non-restrictive examples.

EXAMPLES

Two steels are prepared with the compositions presented in Table 1 below, expressed in per cent by weight.

TABLE 1

Steel compositions used, whereby the balance consists of iron (% by weight).

|   | C | Mn | Si | Al | Cr | Cu | Ni | S | P | N | Ac3 | Ms |
|---|---|----|----|----|-----|-------|------|-------|-------|--------|-----|-----|
| A | 0.196 | 2.195 | 1.528 | 0.038 | 0.245 | 0.009 | 0.019 | 0.002 | 0.013 | 0.004 | 835 | 392 |
| B | 0.19 | 1.49 | 1.45 | <0.01 | <u>0.61</u> | 0.5 | 0.49 | 0.002 | 0.016 | <0.01 | 840 | 403 |

Steel A has a chemical composition in accordance with a preferred embodiment of the present invention while steel B, because it has too high a Cr content, is a reference that is not in conformance with the invention.

The elements that are present in a percentage strictly less than 0.01 are elements, the content of which is considered residual. In other words, the element in question was not added deliberately, but its presence is due to impurities in the other alloy elements.

Sheets corresponding to the compositions described above were produced under the fabrication conditions presented in Table 2.

The compositions of steels A and B were subjected to different annealing conditions. The conditions before hot rolling are identical, a reheating to 1250° C., a temperature at the end of rolling of 920° C. and a coiling temperature of 550° C. The hot-rolled products are then all pickled and then cold rolled at a rate of reduction in the range between 30 and 80%.

Table 2 presents the fabrication conditions for the sheets that were annealed after cold rolling with the following designations:

hold temperature: $T_1$ temperature at the end of cooling $T_{fr}$ hold time at $T_{fr}$: $t_1$ post batch annealing treatment: YES OR NO The post batch annealing treatment, if any, is performed 24 hours after increasing the temperature to 170° C. and holding it at this temperature for 10 H, plus uncontrolled cooling.

The cooling rates between $T_1$ and $T_{fr}$ are all in the range between 50 and 1500° C./s.

TABLE 2

Annealing conditions of the examples and examples presented by way of comparison

| ID | Initial chemical composition | Type | Final thickness (mm) | $T_1$ (° C.) | $T_{fr}$ (° C.) | $t_1$ (s) | Post batch annealing |
|----|----|----|----|----|----|----|----|
| I1 | A | Invention | 0.77 | 805 | 390 | 181 | YES |
| I2 | A | Invention | 0.77 | 802 | 390 | 181 | YES |
| I3 | A | Invention | 0.77 | 807 | 400 | 181 | YES |
| I4 | A | Invention | 0.77 | 813 | 397 | 181 | YES |
| I5 | A | Invention | 0.77 | 816 | 410 | 181 | YES |
| I6 | A | Invention | 0.77 | 812 | 375 | 181 | YES |
| I7 | A | Invention | 0.77 | 810 | 410 | 217 | YES |
| I8 | A | Invention | 0.77 | 809 | 410 | 255 | YES |
| I9 | A | Invention | 0.77 | 807 | 405 | 289 | YES |
| I10 | A | Invention | 0.77 | 807 | 385 | 289 | YES |
| I11 | A | Invention | 0.77 | 810 | 410 | 217 | NO |
| I12 | A | Invention | 0.77 | 809 | 410 | 255 | NO |
| I13 | A | Invention | 0.77 | 807 | 405 | 289 | NO |
| I14 | A | Invention | 0.77 | 807 | 385 | 289 | NO |
| R1 | A | Reference | 0.87 | <u>836</u> | 412 | 217 | YES |

TABLE 2-continued

Annealing conditions of the examples and examples presented by way of comparison

| ID | Initial chemical composition | Type | Final thickness (mm) | $T_1$ (° C.) | $T_{fr}$ (° C.) | $t_1$ (s) | Post batch annealing |
|----|----|----|----|----|----|----|----|
| R2 | A | Reference | 0.87 | <u>836</u> | 405 | 217 | YES |
| R3 | A | Reference | 1.5 | <u>846</u> | 410 | 289 | YES |
| R4 | A | Reference | 1.5 | <u>846</u> | 402 | 289 | YES |
| R5 | B | Reference | 1.5 | <u>890</u> | 400 | 300 | NO |

References R1 to R5 in Table 2 designate steel sheets fabricated under conditions that are not in conformance with the invention. The parameters that are not in conformance with the invention are underlined. It should be noted that references R1 to R4, which come from composition A, are not in conformance with the invention because the hold temperature $T_1$ is above Ac3-15° C. Here, Ac3 is 835° C. measured by dilatometer. Reference R5 from composition B which is not in conformance with the invention, was also annealed above the point Ac3-15° C.

Examples I1 to I14 are examples in accordance with the present invention. Table 3 presents the microstructural properties obtained for the samples analyzed, where the residual austenite is indicated by γr, the polygonal ferrite by a, martensite by M and bainite by B. These values are indicated as area percentages.

TABLE 3

Area percentages of the constituents (invention and reference)

| ID | Type | γr | α | M | B |
|---|---|---|---|---|---|
| I1 | Invention | 15 | 14 | 11 | 60 |
| I2 | Invention | 15 | 20 | 15 | 50 |
| I4 | Invention | 14 | 19 | 13 | 54 |
| I5 | Invention | 10 | 13 | 14 | 63 |
| I6 | Invention | 14 | 14 | 14 | 58 |
| R1 | Reference | 15 | <u>0</u> | <u>22</u> | 63 |
| R5 | Reference | 14 | <u>0</u> | <u>19</u> | 67 |

The mechanical properties were then measured using a test piece of type ISO 20×80 with the dimensions in Table 4 illustrated by FIG. 1. The uniaxial tensile forces used to obtain these mechanical properties were applied in the direction parallel to the direction of the cold rolling.

TABLE 4

Dimensions of the tensile test pieces, expressed in mm

| Type | B | Lo | Lc | R | T | Lt | Blank dimension |
|---|---|---|---|---|---|---|---|
| ISO 20 × 80 | 20 | 80 | 100 | 20 | 30 | 260 | 260 × 32 |

All the sheets according to the present invention exhibit a bainite in the form of laths with inter-lath carbides such that the number N of these carbides larger than 0.1 micrometer per unit of surface area is less than or equal to 50000/mm².

During the V-bending test, the appearance of cracking in the material is reflected by a 5% drop in the force applied by the machine during the bending of the sheet. The test is then discontinued at this stage and the inside angle is measured after the elastic springback; its difference from 180° gives the complementary angle, which must be greater than 90° in the framework of the invention.

The tensile-strength mechanical properties obtained are presented in table 5 below, with the following abbreviations:
elastic limit: Re
mechanical strength Rm
uniform elongation: Al. Unif.
V-bending with the complementary angle (°) at which cracking occurs: V bend.
Ne: Not measured

TABLE 5

Mechanical properties of the references and of the invention

| ID | Re (MPa) | Rm (MPa) | Al. Unif. (%) | V bend (°) |
|---|---|---|---|---|
| I1 | 627 | 1073 | 13.6 | 115.5 |
| I2 | 628 | 1072 | 13.6 | 111.0 |
| I3 | 633 | 1073 | 13.4 | 111.8 |
| I4 | 682 | 1110 | 12.8 | 107.3 |
| I5 | 708 | 1129 | 12.6 | 104.0 |
| I6 | 706 | 1111 | 12.3 | 99.3 |
| I7 | 621 | 1099 | 13.7 | 111.0 |
| I8 | 735 | 1136 | 12.1 | 100.0 |
| I9 | 632 | 1127 | 13.2 | 108.0 |
| I10 | 639 | 1122 | 13.4 | 105.0 |
| I11 | 531 | 1099 | 13.7 | 100.0 |
| I12 | 543 | 1138 | 13.2 | 90.0 |
| I13 | 637 | 1151 | 12.7 | 96.0 |
| I14 | 566 | 1142 | 13.2 | 97.0 |
| R1 | 900 | 1208 | <u>9.2</u> | 86.0 |
| R2 | 881 | 1186 | <u>9.4</u> | Ne |
| R3 | 912 | 1270 | <u>8.3</u> | 60.6 |
| R4 | 913 | 1233 | <u>8.9</u> | Ne |
| R5 | 1020 | 1395 | <u>5.0</u> | 87.0 |

It should be noted that the five references R1 to R5 exhibit uniform elongations as well as V-bend values that are not in conformance with the objectives of the present invention.

The present invention provides a steel sheet which is suitable for the deposition of a zinc coating, in particular using the conventional electro-galvanizing methods.

The present invention also provides a steel that has good weldability using conventional assembly processes such as, to cite one non-restrictive example, resistance spot welding.

The steel sheets in accordance with the present invention can be advantageously used for the fabrication of structural parts, reinforcement components, safety components, anti-abrasive components or transmission discs for application in motor vehicles for use on the ground.

What is claimed is:

1. A cold rolled and annealed steel sheet, the composition of which, expressed in per cent by weight, comprises:

0.15%≤C≤0.25%

1.8%≤Mn≤3.0%

1.2%≤Si≤2%

Al≤0.10%

0%≤Cr≤0.50%

0%≤Cu≤1%

0%≤Ni≤1%

S≤0.005%

P≤0.020%

Nb≤0.015%

Ti≤0.020%

V≤0.015%

Co≤1%

N≤0.008%; and

B≤0.001% whereby Mn+Ni+Cu≤3%;
the remainder of the composition consisting of iron and the inevitable impurities resulting from processing,
a microstructure of the composition including, in area proportions, 5 to 20% polygonal ferrite, 10 to 15% residual austenite, 5 to 15% martensite, the balance being bainite in the form of laths and including, between these laths, inter-lath carbides such that a number N of the inter-lath carbides larger than 0.1 micrometer per unit of surface area is less than or equal to 50000/mm²,
the steel sheet having a mechanical strength greater than or equal to 1000 MPa and a uniform elongation greater than or equal to 12%.

2. The steel sheet as recited in claim 1, wherein the composition includes, expressed in per cent by weight, 0.18%≤C≤0.22%.

3. The steel sheet as recited in claim 1, wherein the composition includes, expressed in per cent by weight, 2%≤Mn≤2.6%.

4. The steel sheet as recited in claim 1, wherein the composition includes, expressed in per cent by weight, 1.4%≤Si≤1.8%.

5. The steel sheet as recited in claim 1, wherein the composition includes, expressed in per cent by weight, 0%≤Cr≤0.35%.

6. The steel sheet as recited in claim 1, wherein a V-bend angle at which cracking occurs is greater than or equal to 90°.

7. The steel sheet as recited in claim 1, further comprising a zinc or zinc-alloy coating.

8. A method for fabricating the cold rolled and annealed steel sheet as recited in claim 1, the method comprising the steps of:
   obtaining the steel sheet recited in claim 1;
   casting the steel sheet in the form of a semi-finished product;
   bringing the semi-finished product to a temperature $T_{rech}$ which is greater than 1150° C. to obtain a reheated semi-finished product;
   hot rolling the reheated semi-finished product to obtain a hot-rolled sheet, the temperature at the end of the hot rolling $T_{fl}$ being greater than or equal to 850° C.;
   coiling the hot rolled sheet at a temperature $T_{coil}$ to obtain a coiled, hot-rolled sheet, $T_{coil}$ being in a range from 540 to 590° C.;
   cooling the coiled, hot-rolled sheet to an ambient temperature;
   performing a batch annealing of the coiled, hot-rolled sheet so a mechanical strength for the coiled, hot-rolled sheet is less than or equal to 1000 MPa;
   uncoiling and pickling the annealed, coiled, hot-rolled sheet to obtain a hot-rolled sheet suitable for cold rolling;
   cold rolling the hot-rolled sheet suitable for cold rolling at a rate of reduction in a range from 30 to 80%, to obtain a cold-rolled sheet;
   annealing the cold rolled sheet by reheating the cold rolled sheet at a rate Vc which is from 2 to 6° C. per second to a temperature $T_1$ which is between Ac3-15° C. and Ac3-45° C. for a period of time $t_1$ which is greater than or equal to 50 seconds;
   cooling the cold-rolled sheet by subjecting the sheet to a first cooling step at a rate of cooling from 50 to 1500° C./s, then to a second cooling step such that the temperature at the end of the second cooling step $T_{fr}$ is between a temperature $T_{fr1}$ equal to Ms-20° C. and a temperature $T_{fr2}$ equal to MS+40° C.;
   holding the cold-rolled sheet in a temperature range from $T_{fr1}$ to $T_{fr2}$ for a length of time $t_2$ between 100 and 1000 seconds;
   cooling the cold-rolled sheet at a rate $V_{R2}$ from 3 to 25° C. per second to the ambient temperature to obtain a cold-rolled and annealed sheet.

9. The fabrication method as recited in claim 8, wherein the temperature Tfl is greater than or equal to 900° C.

10. The fabrication method as recited in claim 8, wherein the step of batch annealing includes a hold at a temperature Tm and a time tm such that:

$$2.29 \times Tm(° C.)+18.6 \times tm(h) \geq 1238,$$

and the hold temperature Tm is greater than 410° C.

11. The fabrication method as recited in claim 8, wherein the temperature $T_1$ is between 790° C. and 820° C.

12. The fabrication method as recited in claim 8, further comprising the step of coating the annealed, cold-rolled sheet with zinc or a zinc alloy.

13. The fabrication method as recited in claim 8, wherein the sheet is annealed at a hold temperature $T_{base}$ in a range from 150° C. to 200° C. for a hold time $t_{base}$ in a range from 10 h to 48 h.

14. A ground-based motor vehicle comprising:
   a cold-rolled and annealed sheet as recited in claim 1.

15. A ground-based motor vehicle comprising:
   a cold-rolled and annealed sheet fabricated by the method recited in claim 8.

16. A method of fabricating a ground-based motor vehicle comprising:
   incorporating into the motor vehicle at least one cold rolled and annealed sheet recited claim 1.

17. The fabrication method recited in claim 8 further comprising the step of:
   incorporating the cold-rolled and annealed sheet into a motor vehicle.

* * * * *